US011702338B2

(12) United States Patent
Dhiba et al.

(10) Patent No.: US 11,702,338 B2
(45) Date of Patent: Jul. 18, 2023

(54) PREPARATION OF PHOSPHORIC ACID

(71) Applicants: Coatex, Genay (FR); OCP SA, Casablanca (MA)

(72) Inventors: Driss Dhiba, Casablanca (MA); Benoît Magny, Cailloux-sur-Fontaines (FR); Hamid Mazouz, Casablanca (MA); Céline Methivier, Lyons (FR); Jacques Mongoin, Quincieux (FR)

(73) Assignees: Coatex; OCP SA

( * ) Notice: Subject to any disclaimer, the term of this patent is extended or adjusted under 35 U.S.C. 154(b) by 496 days.

(21) Appl. No.: 16/762,751

(22) PCT Filed: Nov. 9, 2018

(86) PCT No.: PCT/FR2018/052794
§ 371 (c)(1),
(2) Date: May 8, 2020

(87) PCT Pub. No.: WO2019/092380
PCT Pub. Date: May 16, 2019

(65) Prior Publication Data
US 2021/0171349 A1 Jun. 10, 2021

(30) Foreign Application Priority Data
Nov. 9, 2017 (FR) ...................................... 1760550

(51) Int. Cl.
C01B 25/222 (2006.01)
C01B 25/22 (2006.01)
C08F 20/06 (2006.01)
C08K 3/32 (2006.01)

(52) U.S. Cl.
CPC ............ C01B 25/222 (2013.01); C01B 25/22 (2013.01); C08F 20/06 (2013.01); C08K 2003/329 (2013.01)

(58) Field of Classification Search
None
See application file for complete search history.

(56) References Cited

U.S. PATENT DOCUMENTS

| 4,312,842 A * | 1/1982 | Wilson, Sr. ............. C01B 17/56 423/322 |
| 4,501,724 A | 2/1985 | Goers |
| 4,581,156 A * | 4/1986 | Chatham ............... C01B 25/222 516/131 |
| 5,120,519 A | 6/1992 | Gross |
| 5,185,135 A * | 2/1993 | Pillai ...................... B01D 37/03 210/733 |
| 2010/0170855 A1 | 7/2010 | Hay et al. |
| 2017/0057822 A1 | 3/2017 | Zhang |

FOREIGN PATENT DOCUMENTS

| CN | 106395879 A | 2/2017 |
| EP | 0274177 A2 | 7/1988 |
| WO | 2010080806 A1 | 7/2010 |
| WO | 2015105464 A1 | 7/2015 |
| WO | 2017040795 A1 | 3/2017 |

OTHER PUBLICATIONS

Lisiansky et al. (Engineering Conferences International ECI Digital Archives, Beneficiation of Phosphates VII, 2015, pp. 1-13) (Year: 2015).*

International Search Report for PCT/FR2018/052794 dated Feb. 22, 2019; 3 pages.

* cited by examiner

Primary Examiner — Clare M Perrin
(74) Attorney, Agent, or Firm — Lerner David LLP

(57) ABSTRACT

The invention relates to a method for the industrial preparation of phosphoric acid from an aqueous suspension comprising water and particles of at least one phosphate material dispersed in the presence of at least one additive of the anionic polymer type. Phosphoric acid is obtained by treating this suspension with at least one strong acid. The polymer is obtained by polymerization reaction of at least one acid selected from acrylic acid, methacrylic acid and salts thereof.

The invention relates to the use of this anionic polymer as well as the method for improving the rheology of the suspension and the hydrodynamics of the reaction medium in which the reactions for the manufacture of phosphoric acid take place.

22 Claims, No Drawings

PREPARATION OF PHOSPHORIC ACID

CROSS-REFERENCE TO RELATED APPLICATIONS

The present application is a national phase entry under 35 U.S.C § 371 of International Application No. PCT/FR2018/052794 filed Nov. 9, 2018, which claims priority from French Application No. 1760550 filed Nov. 9, 2017, all of which are hereby incorporated herein by reference.

The invention relates to a method for the industrial preparation of phosphoric acid from an aqueous suspension comprising water and particles of at least one phosphate material dispersed in the presence of at least one additive of the anionic polymer type. Phosphoric acid is obtained by treating this suspension with at least one strong acid. The polymer is obtained by polymerization reaction of at least one acid selected from acrylic acid, methacrylic acid and salts thereof.

The invention relates to the use of this anionic polymer as well as the method for improving the rheology of the suspension and the hydrodynamics of the reaction medium in which the reactions for the manufacture of phosphoric acid take place.

As such, the method for preparing the aqueous suspension comprising water and particles of at least one phosphate material dispersed in the presence of at least one additive of the anionic polymer type is also particularly effective.

The phosphoric acid thus prepared is an essential product for the manufacture of fertilizers, particularly ternary fertilizers, NPK, or binary fertilizers, NP. Phosphoric acid is also used in the manufacture of food products, in particular for the acidification of beverages, or for the treatment of metal surfaces or in the field of microelectronics.

Phosphate rocks are important sources of raw material for the manufacture of phosphoric acid. Phosphoric acid ($H_3PO_4$) can be produced mainly by two methods: wet process and thermal process. The wet process is the most widely used and phosphoric acid from this route can be used to produce phosphate fertilizers (diammonium phosphate or DAP, monoammonium phosphate or MAP or, triple superphosphate or TSP). The acid obtained by the thermal process is of higher purity and is generally used for pharmaceuticals or food products.

In a wet process production unit, phosphoric acid is produced in particular by the action of the strong acid on the natural phosphate ore. Sulfuric acid is the most commonly used strong acid, in which case insoluble calcium sulfate is formed, which is separated by filtration to recover gypsum. The operating conditions are chosen to precipitate the calcium sulfate either in its dihydrate form, producing $P_2O_5$ generally at a concentration of 26-32% at 70-80° C., or in the hemihydrate form, with $P_2O_5$ generally at a concentration of 40-52% at 90-110° C. Evaporation can be used to further concentrate the phosphoric acid afterwards and thus optimize the quality of the acid.

Usually, after extraction, the phosphate rock is treated to be obtained either in dry form or in wet form in which it is mixed with water, for example to form phosphate pulp.

In the latter case, a high concentration of phosphate rock makes it possible to reduce the amount of water used in the treatment of a given amount of phosphate rock. In addition to better management of the resource, the reduction in the amount of water is particularly interesting during the various stages of phosphoric acid preparation.

It is also important to be able to impart improved properties to the phosphate rock particles, in particular properties to improve the efficiency of the phosphoric acid preparation reaction, for example by improving the hydrodynamics of the phosphoric acid preparation reaction. Thus, it is important to have improved methods for the manufacture of phosphoric acid, in particular to increase the overall efficiency of the reaction for the preparation of phosphoric acid from phosphate rock.

The prior art presents various developments in the phosphoric acid manufacturing process. For example, WO 2017 040795 discloses a process to increase the filtration rate or to improve the clarification of phosphoric acid produced by a wet process. This process uses a reagent comprising anionic polymeric microparticles having a molecular mass greater than 60 million daltons.

The document U.S. Pat. No. 5,120,519 discloses anti-scaling agents used in the digestion of phosphate rock to produce phosphoric acid. These agents are copolymers of acrylamide and acrylic acid, which have a molecular mass of at least 1 000 000 g/mol.

The document WO 2010 080806 relates to the control of sedimentation of an aqueous synthetic mixture comprising a phosphate, a phosphonate, an anionic polymer, and an anionic polymer-cationic polymer mixture. The flocculating agents used have a molecular mass ranging from 250 000 to 30 000 000 g/mol.

The document EP 0274177 relates to the production of highly concentrated phosphoric acid by digesting phosphates with an acid consisting mainly of sulfuric acid and phosphoric acid. The process disclosed uses polyacrylamide flocculants which have a very high molecular mass. The document U.S. Pat. No. 5,185,135 discloses a suspension from a wet process for the production of phosphoric acid. This suspension is dewatered by filtration using a polymeric filtration aid having a molecular mass ranging from 200 000 to 40 000 000 g/mol.

In addition, the document WO 2015105464 presents a modification of both the reaction device to optimize the solubilization rate of the phosphate rock at higher values and to ensure better crystallization of the gypsum produced, as well as the filtration method to improve the filterability of the phosphoric acid slurry. The document CN 106395879 is intended to improve the size of gypsum crystals in the manufacture of wet-process phosphoric acid by using a composite additive consisting of a sulfonic acid regulator, a weak organic acid, an ammonium salt buffering agent and a high water-soluble polymer dispersant. Similarly, the document U.S. Pat. No. 4,501,724 proposes a process for the wet process manufacture of concentrated phosphoric acid, based on the use of a mixture of gaseous sulfur trioxide and sulfuric acid instead of concentrated sulfuric acid. This results in a higher heat of reaction allowing the use of a very dilute sulfuric acid or a phosphate from wet milling, without affecting the phosphoric acid titer produced. When preparing phosphoric acid from phosphate rock, it is also important to monitor the overall water balance. Water is necessary as a carrier for the treatment of the phosphate rock with a strong acid, but its amount must nevertheless be limited, in particular to avoid diluting the titer of the acid solution produced.

Similarly, when preparing phosphoric acid from phosphate rock, it is important to be able to improve the hydrodynamics when treating the phosphate rock with the strong acid in order to reduce the loss of phosphorus in unattacked or co-crystallized (syncrystallized) form in the crystals of the gypsum formed.

The method for preparing phosphoric acid according to the invention provides a solution to all or part of these problems, in particular by a significant improvement in the conditions for the manufacture of phosphoric acid.

Thus, the invention provides a method for preparing phosphoric acid comprising treating at a temperature ranging from 40 to 100° C., by means of at least one strong acid, an aqueous suspension (A) comprising water and particles of at least one phosphate material having a size ranging from 10 to 400 µm, and dispersed in the presence of at least one anionic polymer with a molecular mass by weight ($M_W$) of between 1,000 and 90,000 g/mol and obtained by polymerization reaction of at least one acid chosen from acrylic acid, methacrylic acid and salts thereof.

The use of this anionic polymer for the method for preparing phosphoric acid according to the invention makes it possible to obtain a good compromise of the various properties of this preparation process, in particular chemical yield of the reaction, filterability and phosphoric acid titer.

In a particularly advantageous manner, the preparation method according to the invention makes it possible to control the viscosity of the aqueous suspension (A).

Preferably for the preparation method according to the invention, the Brookfield viscosity of the aqueous suspension (A), measured 90 s after preparation of the suspension, at 25° C., at 100 rpm and at a concentration of more than 45% by weight of phosphate material, is less than 1 500 mPa·s or less than 1200 mPa·s, more preferably less than 1000 mPa·s, more preferentially less than 500 mPa·s or even less than 350 mPa·s or less than 200 mPa·s.

More preferably, the Brookfield viscosity of the aqueous suspension (A), measured 90 s after preparation of the suspension, at 25° C., at 100 rpm and at a concentration of more than 60% by weight of phosphate material, is less than 1 500 mPa·s or less than 1200 mPa·s, more preferably less than 1000 mPa·s, more preferentially less than 500 mPa·s or even less than 350 mPa·s or less than 200 mPa·s.

In the implementation of the method according to the invention, the phosphate material particles are treated within the aqueous suspension (A) comprising water and phosphate material particles dispersed in the presence of an anionic polymer.

According to the invention, the phosphate material is processed in the form of particles having a size of less than 400 µm. More preferably, the size of these particles is less than 200 µm or less than 150 µm. Furthermore, the size of these particles is greater than 10 µm, preferentially greater than 30 µm.

Thus, for the preparation method according to the invention, the particle size of the phosphate material can range from 10 to 400 µm or from 10 to 200 µm or from 10 to 150 µm. Preferably, this size may also range from 30 to 400 µm or from 30 to 200 µm or from 30 to 150 µm.

For the preparation method according to the invention, the particles of phosphate material can be processed in dried form. For the preparation method according to the invention, the phosphate material particles can also be processed in the form of an aqueous suspension (B).

Preferably, the aqueous suspension (B) has a concentration of phosphate material of more than 45% by weight. More preferably, the aqueous suspension (B) has a concentration of phosphate material greater than 50%, more preferentially greater than 55%, much more preferentially greater than 60% or 65% or even greater than 70% or 75%. Most preferably, the aqueous suspension (B) also comprises at least one anionic polymer according to the invention.

Also more preferably, the Brookfield viscosity of the aqueous suspension (B), measured 90 s after preparation of the suspension, at 25° C., at 100 rpm and at a concentration of more than 45% by weight of phosphate material, preferably more than 60% by weight of phosphate material, is less than 1 500 mPa·s or less than 1 200 mPa·s, preferably less than 1 000 mPa·s, more preferentially less than 500 mPa·s or even less than 350 mPa·s or less than 200 mPa·s. Particularly preferred, the Brookfield viscosity of the aqueous suspension (B), measured 90 s after preparation of the suspension, at 25° C., at 100 rpm and at a concentration of more than 60% by weight of phosphate material, is less than 1 500 mPa·s or less than 1200 mPa·s, preferably less than 1000 mPa·s, more preferentially less than 500 mPa·s or even less than 350 mPa·s or less than 200 mPa·s.

Preferably for the preparation method according to the invention, the dispersion in water of the phosphate material particles is carried out with stirring by means of a suitable device. More preferably, it is carried out under mechanical stirring. The preparation of the aqueous suspension (A) or the aqueous suspension (B) according to the invention can be carried out at different temperatures. Preferably, it is carried out at a temperature between 10 and 60° C., more preferably between 20 and 50° C. or between 25 and 50° C.

Thus, the use of a polymer according to the invention during the reaction for the preparation of phosphoric acid makes it possible to control the properties of the reaction medium and makes it possible, in particular, to control the viscosity of the reaction medium. The polymer used according to the invention is not a flocculating agent.

For a constant concentration of phosphate material particles and for constant stirring conditions, the reaction medium has in particular a reduced viscosity in the presence of the polymer according to the invention compared with the reaction medium comprising no polymer. The hydrodynamics of the reaction medium is then better controlled; it is improved.

In a particularly advantageous manner, the preparation method according to the invention thus makes it possible to control the hydrodynamics of the reaction medium for the preparation of phosphoric acid. Thus, and preferably for the preparation method according to the invention, the hydrodynamics of the reaction medium for preparing phosphoric acid is improved by means of the anionic polymer used. The use of the anionic polymer lowers the viscosity of the suspension resulting from the preparation reaction, allowing the Reynolds number to be increased, thus improving the hydrodynamics of the phosphoric acid preparation reaction, according to the formula:

$$Re = \frac{\rho V_{moy} D}{\eta}$$

for which
$R_e$ represents the Reynolds number,
$\rho$ represents the density of the fluid [kg/m$^3$],
$V_{moy}$ represents the characteristic velocity of the fluid [m/s],
D represents the characteristic dimension [m],
$\eta$ represents the dynamic viscosity of the fluid [Pa·s].

Preferably, the method according to the invention is conducted in turbulent or very turbulent conditions. Preferably, the Reynolds number when carrying out the method according to the invention is greater than or equal to 2,100, preferably greater than 2,500 or 3,000, or even greater than these values. Preferably, the method according to the invention makes it possible to increase the Reynolds number compared with a medium not comprising a polymer according to the invention. Preferably, this Reynolds number increase is greater than 10% or greater than 20%.

Also advantageously compared with methods for the preparation of phosphoric acid of the prior art, the preparation method according to the invention makes it possible to maintain or increase the chemical yield of the reaction. Thus in a preferred manner, the method for preparing phosphoric acid according to the invention makes it possible to achieve a chemical yield of the reaction for the preparation of phosphoric acid of more than 90% by weight of phosphorus equivalent within the initial phosphate material. More preferably according to the invention, the chemical yield of the reaction for preparing phosphoric acid is greater than 92%, more preferentially greater than 94% or even 95% or even greater than 96% or 98%, by weight of phosphorus equivalent within the initial phosphate material.

Also in a particularly advantageous manner compared with methods for preparing phosphoric acid of the prior art, the preparation method according to the invention makes it possible to reduce the amount of residual sulfate ions in the aqueous solution of prepared phosphoric acid. Preferably, the aqueous phosphoric acid solution comprises residual sulfate ions in a weight concentration ranging from 20 to 35 g/L. More preferably, the aqueous phosphoric acid solution comprises residual sulfate ions in a weight concentration of 22 to 26 g/L.

Also advantageous in comparison with methods for preparing phosphoric acid of the prior art, the preparation method according to the invention makes it possible to obtain an aqueous solution of phosphoric acid with a particularly advantageous phosphoric acid titer. Preferably the prepared phosphoric acid has a $P_2O_5$ titer greater than 25%, more preferentially greater than 28% or 30%.

Also advantageous in comparison with methods for preparing phosphoric acid of the prior art, the preparation method according to the invention makes it possible to obtain an aqueous solution of phosphoric acid with a particularly advantageous concentration by weight of phosphoric acid. Preferably the prepared aqueous phosphoric acid solution has a concentration by weight of prepared phosphoric acid of between 20 and 45%, more preferentially between 25 and 40%, even more preferentially between 30 and 35%.

The method for preparing phosphoric acid according to the invention comprises treating an aqueous suspension (A) comprising water and particles of at least one phosphate material with at least one strong acid.

Preferably according to the invention, the aqueous suspension (A) may be prepared beforehand. Thus, the method for preparing phosphoric acid according to the invention may include
 (a) preparing, optionally with stirring, a mixture of water, particles of phosphate material and at least one anionic polymer obtained by polymerization reaction of at least one acid selected from acrylic acid, methacrylic acid and salts thereof, to form the aqueous suspension (A);
 (b) treating the aqueous suspension (A) with at least one strong acid to form an aqueous solution of phosphoric acid.

In carrying out the method for preparing phosphoric acid according to the invention, the particles of phosphate material are subjected to acid attack during the treatment of the aqueous suspension (A) with the strong acid. During this acid attack, phosphogypsum particles are formed.

Phosphogypsum is a gypsum of phosphate origin. It is calcium sulfate. Different forms of calcium sulfate may be present, including hydrated calcium sulfate, calcium sulfate dihydrate or anhydrous calcium sulfate.

Preferably according to the invention, the strong acid used in the treatment of the aqueous suspension (A) is a mineral strong acid. More preferably according to the invention, the strong acid has a pKa of less than 4 or less than 3, or even less than 2.5. Even more preferentially, the strong acid is selected from sulfuric acid, phosphoric acid, nitric acid, hydrochloric acid and mixtures thereof. Even more preferentially, strong acid is sulfuric acid, phosphoric acid or mixtures thereof.

The phosphogypsum crystals formed during the preparation method according to the invention may be of different shapes or sizes.

Advantageously, the preparation method according to the invention makes it possible to obtain, during treatment with sulfuric acid, particular phosphogypsum particles. In a particularly advantageous manner, the preparation method according to the invention makes it possible to obtain crystalline forms of particular phosphogypsum particles which can be separated, in particular by filtration, in a very efficient manner. And very advantageously, these phosphogypsum particles have acicular (A), tabular (B) and compact crystal or polycrystalline aggregate (C) forms. In addition to their specific morphologies, these different crystalline forms can be characterized by their dimensions, generally according to the sizes shown in Table 1.

TABLE 1

|  | length (μm) | width (μm) | thickness (μm) |
| --- | --- | --- | --- |
| acicular crystals | 80-500 | 20-100 | 5-10 |
| tabular crystals | 40-200 | 30-150 | 5-10 |
| compact crystals | 40-200 | 30-150 | several dozen |
| polycrystalline aggregates | sphere with a diameter of 50 to 100 μm | | |

Preferably, the preparation method according to the invention makes it possible to obtain gypsum crystals with improved filterability. Advantageously, these gypsum crystals have a compact morphology. In particular, the three dimensions—length, width and thickness—of these crystals are relatively similar. Preferably, thanks to these relatively close dimensions, the gypsum crystals resulting from the implementation of the preparation method according to the invention have a general morphology close to a spherical shape or a shape that can fit into a spherical or quasi-spherical volume. Thus, preferably, the preparation method according to the invention makes it possible to obtain gypsum crystals whose sphericity (ratio between the radius of the inscribed circle of the particle and the radius of the circumscribed circle of the particle) which measures the deviation between the shape of the particles with respect to a spherical particle is close to 1.

The preparation method according to the invention therefore allows efficient filtration of phosphogypsum particles. Thus, the overall chemical yield of the phosphoric acid preparation is particularly advantageous. According to the invention, the evaluation of the overall chemical yield of the phosphoric acid preparation expressed in $P_2O_5$ equivalent is carried out by comparing the titer of the $P_2O_5$ losses in the phosphogypsum during the preparation of the strong acid solution produced with the $P_2O_5$ titer of the phosphate rock starting material. The loss titration is carried out for gypsum washing solutions from which impregnated $P_2O_5$ is recovered, and for gypsum crystals in which $P_2O_5$ is present in unreacted or syncrystallized form. The overall yield is then evaluated according to the equation $$Yld = \left(1 - \frac{Pt \times CaOpp}{CaOgy \times P2O5pp}\right) \times 100$$

for which

Yld represents the chemical yield (%),
Pt represents the total $P_2O_5$ losses in gypsum,
CaOpp represents the CaO titer in the phosphate,
CaOgy represents the CaO titer in gypsum,
$P_2O_5$pp represents the $P_2O_5$ titer in the phosphate.

Advantageously, the implementation of the preparation method according to the invention improves the chemical yield of the phosphoric acid preparation. The improvement may in particular come from a limitation of the losses of unreacted $P_2O_5$ during the preparation of phosphoric acid, a reduction of the losses of the syncrystallized $P_2O_5$ in the gypsum or a better separation of the gypsum making it possible to reduce the losses of $P_2O_5$ remaining impregnated in the solid residue of filtration.

Preferably according to the invention, the separated phosphogypsum crystals are oblong in shape and have a size of about 250 µm or a size of 220-350 µm (Q1). Also preferably according to the invention, the separated phosphogypsum crystals are semi-oblong in shape with a size of about 150 µm or a size of 125-160 µm (Q2). Also preferably according to the invention, the separated phosphogypsum crystals are more compact or star-shaped in size about 50 µm or size about 40-85 µm (Q3).

Preferably, the preparation method according to the invention comprises separating (c) the aqueous solution of phosphoric acid from the phosphogypsum crystals formed during treatment (b). More preferably, these phosphogypsum crystals are separated by filtration.

Preferably, the method for preparing the invention improves the separation of gypsum crystals from phosphoric acid by filtration. More preferably, the filtration coefficient or filterability is improved by more than 0.5 $tP_2O_5/m^2/d$ or 1 $tP_2O_5/m^2/d$ or even 2 $tP_2O_5/m^2/d$, compared with a separation method which does not use a polymer.

An essential characteristic of the aqueous suspension (A) implemented according to the invention is that it comprises at least one anionic polymer combined with water and particles of at least one phosphate material. The anionic polymer according to the invention is obtained by polymerization reaction of at least one acid selected from acrylic acid, methacrylic acid and salts thereof.

During the preparation of the anionic polymer used according to the invention, the polymerization reaction uses at least one anionic monomer comprising at least one polymerizable olefinic unsaturation and at least one carboxylic acid function, in particular an anionic monomer comprising at least one polymerizable ethylenic unsaturation and at least one carboxylic acid function. Preferably the anionic monomer is chosen from acrylic acid, methacrylic acid, a salt of acrylic acid, a salt of methacrylic acid. This polymerization reaction can also use these two acrylic and methacrylic acids and salts thereof.

The polymer used according to the invention may also be a copolymer obtained by a polymerization reaction using at least one other acid selected from acrylic acid, methacrylic acid, maleic acid, itaconic acid and salts thereof, as well as at least one other comonomer which may be an ester of an acid selected from acrylic acid and methacrylic acid.

Other comonomers which can be used in the preparation of the copolymer according to the invention include a non-ionic monomer selected from esters of an acid comprising at least one monocarboxylic acid function, in particular an ester of an acid selected from acrylic acid, methacrylic acid, a salt of acrylic acid, a salt of methacrylic acid and mixtures thereof. Examples of such comonomers include a compound selected from styrene; vinylcaprolactam; alkyl acrylate, in particular $C_1$-$C_{10}$-alkyl acrylate, preferentially $C_1$-$C_4$-alkyl acrylate, more preferentially methyl acrylate, ethyl acrylate, propyl acrylate, isobutyl acrylate, n-butyl acrylate; alkyl methacrylate, in particular $C_1$-$C_{10}$-alkyl methacrylate, preferentially $C_1$-$C_4$-alkyl methacrylate, more preferentially methyl methacrylate, ethyl methacrylate, propyl methacrylate, isobutyl methacrylate, n-butyl methacrylate; aryl acrylate, preferably phenoxyethylacrylate; aryl methacrylate, preferably phenoxyethylmethacrylate. Methyl acrylate, ethyl acrylate, propyl acrylate, isobutyl acrylate, n-butyl acrylate, methyl methacrylate, ethyl methacrylate, propyl methacrylate, isobutyl methacrylate and n-butyl methacrylate are particularly preferred.

Other comonomers which may be used in the preparation of the copolymer according to the invention include a compound selected from 2-acrylamido-2-methylpropane sulfonic acid, 2-acrylamido-2-methylpropane sulfonic acid salt, ethoxymethacrylate sulfonic acid, ethoxymethacrylate sulfonic acid salt, sodium methallyl sulfonate, styrene sulfonic acid and salts thereof.

Preferably, the anionic polymer according to the invention is prepared in the absence of acrylamide or in the absence of N,N'-methylenebisacrylamide; the polymer according to the invention is not cross-linked.

Preferably, the polymer used according to the invention is partially or totally neutralized. More preferentially, it is partially or totally neutralized by means of at least one derivative selected from an alkali metal, an alkaline earth metal and mixtures thereof, in particular a derivative comprising at least one element selected from lithium, sodium, calcium, magnesium and mixtures thereof, for example NaOH, KOH, $Ca(OH)_2$. Sodium, calcium and mixtures thereof are particularly preferred. Neutralization by means of sodium and calcium can be carried out using at least one compound selected from NaOH, $Ca(OH)_2$ and mixtures thereof. The respective proportions of sodium and calcium may vary quite widely. For example, the Na/Ca molar ratio may range from 98/2 to 30/70, preferably from 95/5 to 40/60, more preferentially from 90/10 to 30/70 or from 90/10 to 40/60, even more preferentially from 70/30 to 40/60, especially 50/50.

Preferably, the anionic polymer used according to the invention has a molecular mass by weight ($M_W$) between 2,000 and 90,000 g/mol, preferably between 1,000 or 2,000 to 50,000 g/mol, even more preferentially between 1,000 or 2,000 to 10,000 g/mol, and more preferably between 1,500 or 2,000 to 8,000 g/mol. According to the invention, the molecular mass by weight ($M_W$) is measured by steric exclusion chromatography (SEC).

The preferred polymers used according to the invention are homopolymers of acrylic acid or copolymers of acrylic acid and 2-acrylamido-2-methylpropane sulfonic acid, in particular neutralized homopolymers of acrylic acid or neutralized copolymers of acrylic acid and 2-acrylamido-2-methylpropane sulfonic acid. The more particularly preferred polymers used according to the invention are neutralized homopolymers of acrylic acid or neutralized copolymers of acrylic acid and 2-acrylamido-2-methylpropane sulfonic acid, whose molecular mass by weight ($M_W$) is between 1,000 and 10,000 g/mol, preferably between 1,500 and 8,000 g/mol. Examples of particularly preferred copolymers used according to the invention are selected from polymer (P1): homopolymer having a molecular mass of 5,000 g/mol and obtained by polymerization of acrylic acid in the presence of copper sulfate, iron sulfate, hydrogen peroxide and 2-(1-carboxyethylsulfanylcarbothioylsulfanyl)propanoic acid (DPTTC—CAS No. 6332-91-8), neutralized with sodium and calcium (70/30 molar based on the amount of acrylic acid);

polymer (P2): homopolymer having a molecular mass of 4,200 g/mol and obtained by polymerization of acrylic acid in the presence of copper sulfate, iron sulfate, hydrogen peroxide and sodium hypophosphite, neutralized with sodium and calcium (90/10 molar with respect to the amount of acrylic acid);

polymer (P3): polymer having a molecular mass of 4,800 g/mol and obtained by polymerization of acrylic acid in the presence of sodium persulfate and sodium hypophosphite, neutralized with sodium and calcium (50/50 molar with respect to the amount of acrylic acid);

polymer (P4): copolymer having a molecular mass of 3,800 g/mol and obtained by polymerizing acrylic acid and 2-acrylamido-2-methylpropanesulfonic acid (77.5/12.5 by mass) in the presence of sodium persulfate and sodium hypophosphite, neutralized with sodium and calcium (50/50 molar based on the amount of acrylic acid)

polymer (P5): homopolymer having a molecular mass of 4,200 g/mol and obtained by polymerization of acrylic acid in the presence of copper sulfate, iron sulfate, hydrogen peroxide and sodium hypophosphite, neutralized with sodium and calcium (30/70 molar based on the amount of acrylic acid).

For the method according to the invention, the amount of anionic polymer used may vary quite widely. Preferably, the amount by weight (dry/dry) of anionic polymer used is between 0.05 and 5%, more preferentially between 0.1 and 2%, based on the amount of phosphate material. Also preferably for the preparation method according to the invention, the amount by weight (dry/dry) of anionic polymer used is between 0.1 and 5% by weight, based on the amount of phosphate material. More preferably for the preparation method according to the invention, the amount by weight (dry/dry) of anionic polymer used is between 0.15 and 2% by weight based on the amount of phosphate material.

Due to the special properties conferred on the particles of phosphate material combined with the anionic polymer used according to the invention, the acid treatment of the aqueous suspension (A) is improved. Thus, the aqueous suspension (A) comprises a foamy phase whose volume is limited or even nil during the acid treatment. Preferably, during this treatment of the aqueous suspension (A) by means of a strong acid according to the invention, this suspension comprises a foamy phase whose volume is reduced to 40% or even reduced to 20% of the total volume of the suspension.

Advantageously, the aqueous suspension (A) according to the invention has a bulk density, measured by means of a pycnometer and for a solids content of more than 60% by weight, of between 1.5 and 2, preferably between 1.7 and 2.

During the acid treatment of the aqueous suspension (A) according to the invention, the reaction conditions for the preparation of phosphoric acid are modified. The use of an anionic polymer according to the invention thus makes it possible to modify the parameters of the reaction for the preparation of phosphoric acid.

Thus, in addition to a method for preparing phosphoric acid from an aqueous suspension (A), the invention also relates to a method of improving the hydrodynamics of the phosphoric acid preparation reaction.

A method for improving the hydrodynamics of the reaction for the preparation of phosphoric acid by treating at a temperature ranging from 40 to 100° C., by means of at least one strong acid, an aqueous suspension (A) of particles of at least one phosphate material having a size ranging from 10 to 400 µm, comprises the use of at least one anionic polymer with a molecular mass by weight ($M_W$) of between 1,000 and 90,000 g/mol and obtained by polymerization reaction of at least one acid chosen from acrylic acid, methacrylic acid and salts thereof.

Preferably, the method of improving hydrodynamics according to the invention makes it possible to reduce phosphoric acid losses, expressed in $P_2O_5$ equivalent. In a particularly preferred manner, the method of improving hydrodynamics according to the invention makes it possible to reduce the losses of phosphoric acid, expressed in $P_2O_5$ equivalent, by reducing the losses of $P_2O_5$ present within the phosphate rock which is not attacked during acid treatment or by reducing the losses of $P_2O_5$ equivalent which are bound to the phosphorus present in syncrystallized form within the phosphogypsum crystals.

Also preferably, the method of improving hydrodynamics according to the invention increases the overall efficiency of the phosphoric acid manufacturing reaction.

For the method of improving hydrodynamics according to the invention, the characteristics of the reaction for the preparation of phosphoric acid are those of the reaction for the preparation of phosphoric acid defined according to the invention.

For the method of improving hydrodynamics according to the invention, the polymer is the anionic polymer used in the reaction for the preparation of phosphoric acid defined according to the invention.

For the method of improving hydrodynamics according to the invention, the phosphate material is the phosphate material used in the reaction for the preparation of phosphoric acid defined according to the invention.

The particular, advantageous or preferred characteristics of the preparation method according to the invention make it possible to define in an analogous manner methods of improving hydrodynamics according to the invention which are particular, advantageous or preferred.

In a particularly effective way, the different aspects of the invention make it possible to improve the efficiency of the different stages using the phosphate material. In particular, the invention allows a significant improvement in the overall chemical yield of the treatment of phosphate rock used for the preparation of phosphoric acid.

The following examples illustrate the different aspects of the invention.

EXAMPLE 1: PREPARATION OF PHOSPHATE ROCK PULP

From a phosphate rock pulp, which is an aqueous suspension comprising water and particles of phosphate material, the characteristics of this suspension are determined. The phosphate material comes from the Khouribga (Morocco) deposits. The pulp is prepared by mixing water and crushed and ground phosphate rock, and optionally the anionic polymer according to the invention.

Particle Size of Phosphate Material:

The particle size distribution of phosphate rock pulp is measured using a Malvern Mastersizer 2000 laser diffraction granulometer. The results are shown in Table 2.

TABLE 2

| median particle size | size (μm) |
|---|---|
| $d_{10}$ | 13.33 |
| $d_{50}$ | 130.65 |
| $d_{90}$ | 280.67 |

Pulp Density:

The density is determined at 25° C. using a pycnometer of size 1501/100 (Sheen S230729) with a volume of 100 cm3. The clean pycnometer is weighed empty. The homogenized phosphate rock pulp is introduced into the pycnometer; the air present is purged and the pycnometer is closed. The full pycnometer is weighed. The mass of the empty pycnometer is subtracted from the mass of the full pycnometer, the value of this difference is multiplied by 10 and the density of the phosphate rock pulp is obtained. The results are presented in Table 3.

TABLE 3

| | solids content (% by weight) | density |
|---|---|---|
| polymer-free pulp | 51 | 1.538 |
| polymer-free pulp | 58 | 1.709 |
| pulp with polymer (P4) 0.4% by weight | 70.4 | 1.915 |

The use of a polymer according to the invention makes it possible to significantly increase the phosphate rock solids content and the density of the pulp while allowing easy handling of this concentrated pulp.

Viscosity of the Pulp:

In a 250 mL beaker at 25° C., 300 g of phosphate rock pulp is introduced into a 250 mL beaker with mechanical stirring (600 rpm—for 2 min). If necessary, the polymer according to the invention is added in the dry/dry amounts of dry polymer relative to the amount of dry phosphate rock shown in Table 3. Stirring is stopped and, after 90 s, the viscosity is measured at 23° C. by means of a Brookfield viscometer equipped with a type S63 spindle at a rotation speed of 100 rpm. The results are shown in Table 4.

TABLE 4

| | dry substance (% by weight) | viscosity (mPa · s) |
|---|---|---|
| polymer-free pulp | 70 | not measurable (paste) |
| pulp with polymer (P1) 0.2% by weight | >70 | 230 |
| pulp with polymer (P3) 0.3% by weight | >70 | 260 |
| pulp with polymer (P4) 0.4% by weight | >70 | 229 |

Whereas polymer-free pulp does not allow viscosity to be measured, the pulp comprising polymer according to the invention has a controlled viscosity which makes it easily handled and transportable, in particular by gravity.

EXAMPLE 2: PREPARATION OF PHOSPHORIC ACID AND CHARACTERIZATION OF ITS QUALITY

The phosphate material particles of an aqueous suspension according to Example 1 are brought into contact with sulfuric acid in the dihydrate process for the manufacture of phosphoric acid. A slurry is obtained which is filtered to separate the phosphogypsum and obtain an aqueous solution of phosphoric acid. A solution of strong phosphoric acid is obtained. If necessary, it can be concentrated by evaporating water under vacuum. Washing the phosphogypsum with a dilute solution of phosphoric acid or with water or sulfate-rich water can produce medium or weak phosphoric acid solutions.

A similar procedure is used for different suspensions prepared according to Example 1.

The reaction for the preparation of phosphoric acid is characterized by different parameters. The filtration time provides information on the shape of the phosphogypsum crystals present in the phosphate material. The filtration time also provides information on the quality of the phosphoric acid produced. The density indicates the titer of the phosphoric acid produced and must be above 1.266 at 25° C. to reach a generally acceptable quality.

The amount of free sulfate present in the acid (g/L) is estimated from the level of residual sulfuric acid that did not react during the treatment of the phosphate material particles in the suspension. It provides information on the evolution of the phosphoric acid preparation reaction. Preferably, the aqueous phosphoric acid solution contains residual sulfate ions in a weight concentration of 20 to 35 g/L. More preferably, the aqueous phosphoric acid solution comprises residual sulfate ions in a weight concentration of 22 to 26 g/L.

The filtrability of the phosphate material suspension (tons $P_2O_5/m^2/day$) enables the production capacity of strong phosphoric acid to be evaluated. The filtrability of phosphogypsum is linked to its crystallinity. Particular shapes of phosphogypsum crystals can lead to piling up which degrades the efficiency of filtration or to filter clogging. On a scale of 1 to 7, the filtrability should range from 5 to 7, preferably 6 to 7. The filtrability F is calculated according to the formula:

$$F = \frac{A}{\left(1 - \frac{B}{100}\right) * \sqrt{t1 + t2 + t3}}$$

for which

A represents the specific constant of the measurement technology,

B represents the moisture content of the phosphogypsum (% by weight), t1 represents the filtration time of the strong phosphoric acid (s), t2 represents the average phosphoric acid filtration time (s), t3 represents the filtration time of weak phosphoric acid (s).

The filtrability results obtained are presented in Table 5.

TABLE 5

| pulp (solids content-% by weight) | filtrability |
|---|---|
| polymer-free pulp (60) | 5 |
| pulp with polymer (P1) 0.2 % by weight (>70) | 7 |
| pulp with polymer (P3) 0.3% by weight (>70) | 6 |
| pulp with polymer (P4) 0.4 % by weight (>70) | 7 |

The presence of polymer according to the invention in the aqueous suspension of particles of phosphate material makes it possible to obtain a filterability maintained or even improved while making it possible to increase the solids content. The efficiency of the method for producing strong phosphoric acid is improved.

Performance of the phosphoric acid preparation reaction and quality of the phosphoric acid produced: density and titer of the strong acid.

After acid treatment and filtration of the phosphate material suspension, the density of the strong phosphoric acid is measured with a density meter graduated from 1200 to 1300 or 1300 to 1400 and at a temperature of 25° C. The titration of the phosphoric acid solution is carried out in a manner known per se. The results obtained are shown in Table 6.

TABLE 6

| pulp (solids content-% by weight) | density | filterability | $P_2O_5$ titer |
|---|---|---|---|
| polymer-free pulp (60) | 1.274 | 5.4 | 25.33 |
| pulp with polymer (P4) 0.4% by weight (>70) | 1.289 | 6.7 | 29.67 |

The presence of polymer according to the invention in the aqueous suspension of particles of phosphate material makes it possible to prepare a highly concentrated pulp with very improved properties. The $P_2O_5$ titer is improved. Similarly, the acid density is improved.

When phosphoric acid is prepared by treating the aqueous suspension of phosphate material particles with sulfuric acid, the phosphogypsum (calcium sulfate) crystals must have controlled dimensions to improve their separation by filtration. The sizes and dimensions of the crystals of different filtration retentate are determined using an optical microscope (Olympus SZX-ILLD200, DF PLFL 1.6* PF lens) producing images processed with Imagej software.

Different crystal forms are present: acicular (A), tabular (B) or compact crystals or polycrystalline aggregates (C). For these crystals of different shapes, several size ranges are present. Among these crystals are oblong crystals of about 250 μm or 220-350 μm in size (Q1), semi-oblong crystals of about 150 μm or 125-160 μm in size (Q2) and more compact or star-shaped crystals of about 50 μm or 40-85 μm in size (Q3). Type (Q3) crystals provide the best filterability results. The results are shown in Table 6.

The relative amounts of type (Q3) crystals are increased and the filterability of phosphogypsum crystals is improved.

Evaluation of Losses of Phosphoric Acid Produced:

In the preparation of phosphoric acid expressed in $P_2O_5$ equivalent, the overall chemical yield of the phosphoric acid preparation may be reduced due to acid losses. Generally, the method of acid preparation leads to losses of acid in different forms. These losses can be identified and measured. Part (A) of the product losses corresponds to the phosphoric acid present in the phosphate rock which is not attacked during acid treatment. Part (B) of the phosphoric acid product losses is related to the acid trapped in syncrystallized form within the phosphogypsum crystals. Part (C) of the phosphoric acid product loss results from the presence of acid in solution in the wash waters. The results are presented in Table 7.

TABLE 7

| pulp (solids content-% by weight) | $P_2O_5$ losses (% by weight) | | | $P_2O_5$ yield (% by weight) |
| | A | B | C | |
|---|---|---|---|---|
| polymer-free pulp (60) | 0.12 | 0.81 | 0.82 | 92.0 |
| polymer-free pulp (>70) | 0.12 | 0.67 | 0.67 | 94.3 |
| pulp with polymer (P4) 0.4% by weight (>70) | 0.03 | 0.2 | 0.1 | 98.6 |

In addition to a strong improvement in the overall efficiency of the phosphoric acid preparation reaction, the use of a polymer according to the invention in the reaction for the preparation of phosphoric acid from the aqueous suspension of phosphate material particles reduces the various losses of phosphoric acid. In particular, the acid losses resulting from the unattacked phosphate material during the acid treatment are greatly reduced.

The invention claimed is:

1. A method for preparing an aqueous phosphoric acid solution comprising treating at a temperature ranging from 40 to 100° C., an aqueous suspension (A) with a strong acid to form an aqueous phosphoric acid solution and phosphogypsum particles,
    wherein the aqueous suspension (A) comprises water and particles of at least one phosphate material whose size is between 10 and 400 μm dispersed in the presence of at least one anionic polymer with a molecular mass by weight ($M_W$) of between 1,000 and 90,000 g/mol and obtained by polymerization reaction of at least one acid chosen from acrylic acid, methacrylic acid and salts thereof.

2. The preparation method as claimed in claim 1, wherein the Brookfield viscosity of the aqueous suspension (A), measured 90 s after preparation of the suspension, at 25° C., at 100 rpm and at a concentration of more than 45% by weight of phosphate material.

3. The preparation method as claimed in claim 1, wherein the strong acid used is selected from sulfuric acid, nitric acid, hydrochloric acid, and a mixture of these acids.

4. The preparation method as claimed in claim 1, wherein the strong acid is sulfuric acid.

5. The preparation method as claimed in claim 1, wherein the phosphoric acid has a $P_2O_5$ titer of more than 25%.

6. The preparation method as claimed in claim 1, wherein the aqueous suspension (A) is prepared by stirring,
    a mixture of water, particles of phosphate material and at least one anionic polymer obtained by polymerization reaction of at least one acid selected from acrylic acid, methacrylic acid and salts thereof.

7. The preparation method as claimed in claim 1 further comprising (c) separating the aqueous solution of phosphoric acid from the phosphogypsum particles.

8. The preparation method as claimed in claim 7, wherein the separated phosphogypsum particles
    are oblong in size about 250 μm or 220-350 μm,
    have a ratio between the radius of the inscribed circle of the particle and the radius of the circumscribed circle of the particle close to 1.

9. The preparation method as claimed in claim 7, wherein the phosphogypsum particles are separated by filtration.

10. The preparation method as claimed in claim 1, wherein the aqueous phosphoric acid solution has a concentration by weight of prepared phosphoric acid of between 20 and 45%.

11. The preparation method as claimed in claim 6, wherein the particles of phosphate material are provided in dried form.

12. The preparation method as claimed in claim 1, wherein the phosphate material particles are provided in an aqueous suspension (B).

13. The preparation method as claimed in claim 12, wherein the aqueous suspension (B) also comprises at least one anionic polymer with a molecular mass by weight ($M_W$) of between 1,000 and 90,000 g/mol and obtained by polymerization reaction of at least one acid chosen from acrylic acid, methacrylic acid and salts thereof.

14. The preparation method as claimed in claim 13, wherein the aqueous suspension (B) has a concentration of phosphate material greater than 50%.

15. The preparation method as claimed in claim 13, wherein the Brookfield viscosity of the aqueous suspension (B), measured 90 s after preparation of the suspension, at 25° C., at 100 rpm and at a concentration of more than 45% by weight of phosphate material, is less than 1,500 mPa·s.

16. The preparation method as claimed in claim 1, wherein the polymer is partially or totally neutralized.

17. The preparation method as claimed in claim 1, wherein the anionic polymer is obtained by a polymerization reaction also using at least one ester of an acid selected from acrylic acid and methacrylic acid.

18. The preparation method as claimed in claim 1, wherein the anionic polymer has a molecular mass by weight ($M_W$) of from 2,000 to 90,000 g/mol.

19. The preparation method as claimed in claim 1, wherein the amount by weight (dry/dry) of anionic polymer used is between 0.1 and 5%, based on the amount of phosphate material.

20. The preparation method as claimed in claim 1, wherein the strong acid has a pKa of less than 4.

21. The preparation method as claimed in claim 1, wherein the aqueous suspension comprises a foamy phase whose volume is reduced to 40% of the total volume of the suspension.

22. A method for improving the hydrodynamics of a reaction medium during preparation of phosphoric acid, the method comprising the step of treating at a temperature ranging from 40 to 100° C., with at least one strong acid, an aqueous suspension (A) of particles of at least one phosphate material having a size of between 10 and 400 μm, dispersed in the presence of at least one anionic polymer with a molecular mass by weight ($M_W$) of between 1,000 and 90,000 g/mol and obtained by polymerization reaction of at least one acid chosen from acrylic acid, methacrylic acid and salts thereof.

\* \* \* \* \*